No. 679,296. Patented July 30, 1901.
F. CLARK.
FISH HOOK.
(Application filed Oct. 12, 1900.)
(No Model.) 2 Sheets—Sheet 1.
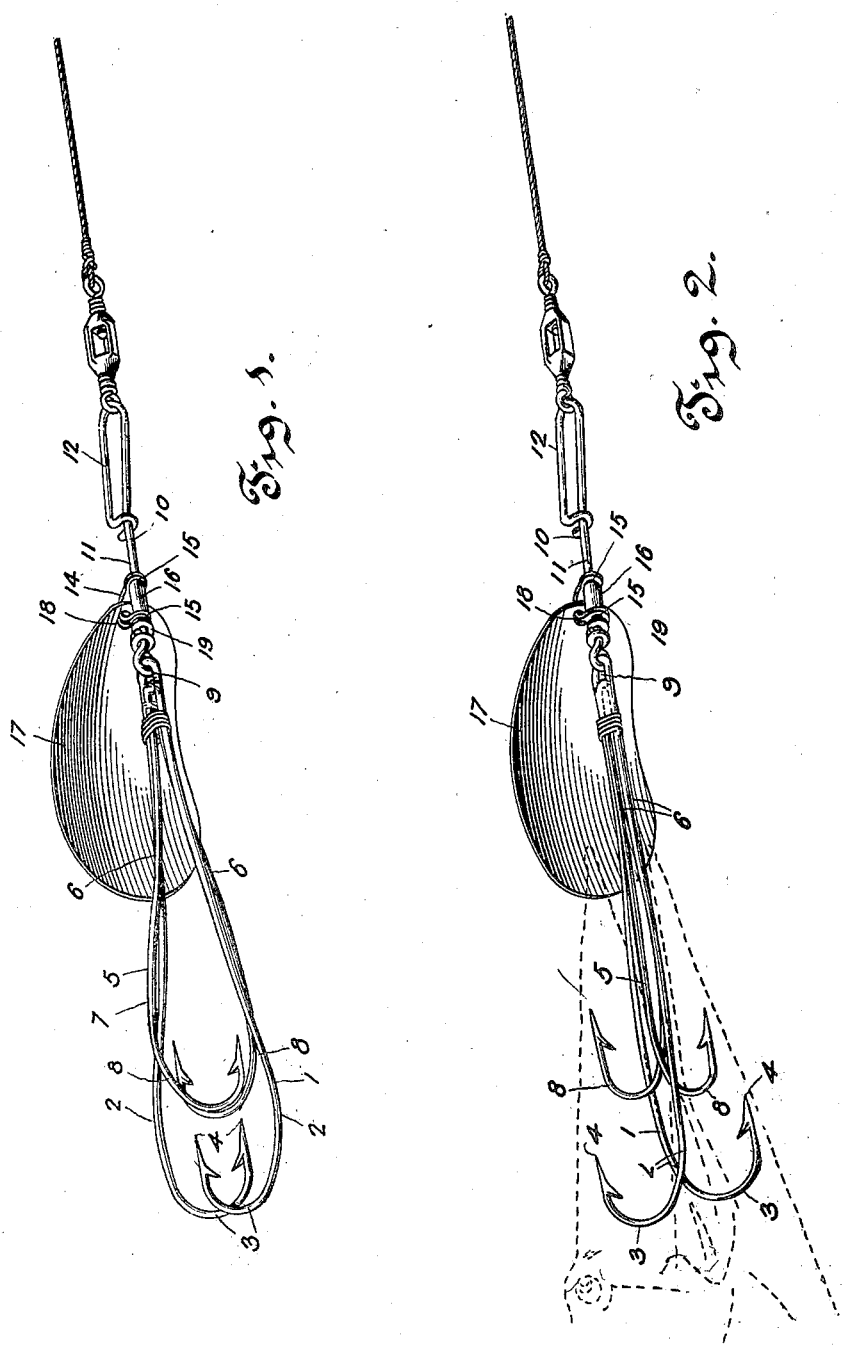
Witnesses
Fred Clark, Inventor.
By C. A. Snow & Co.
Attorneys No. 679,296. Patented July 30, 1901.
F. CLARK.
FISH HOOK.
(Application filed Oct. 12, 1900.)
(No Model.) 2 Sheets—Sheet 2.
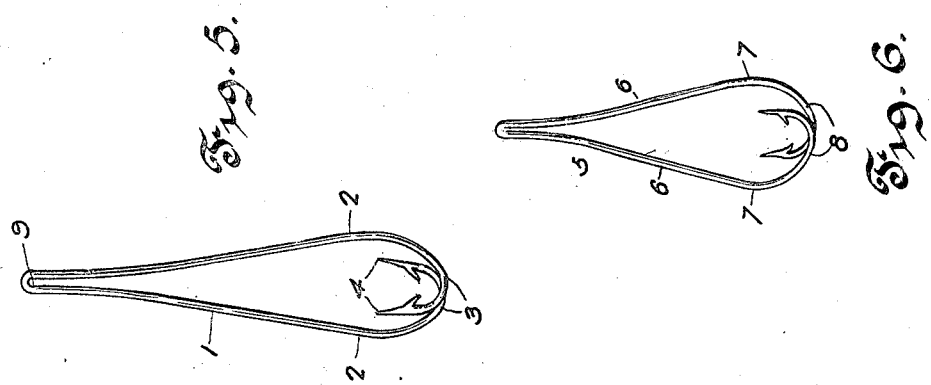
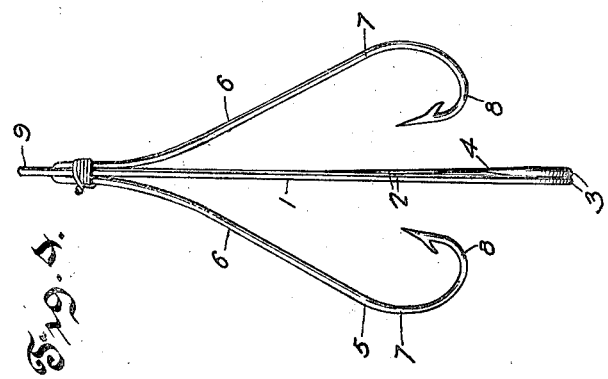
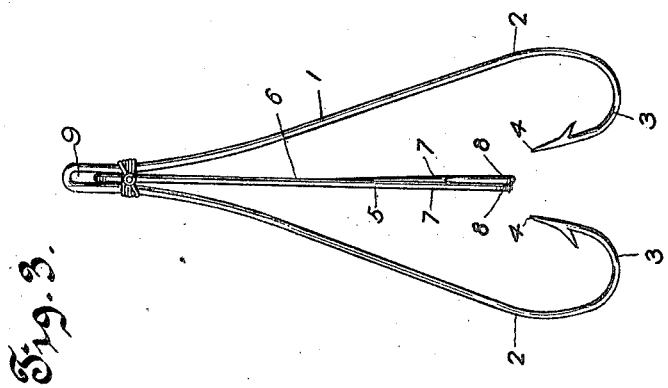
Witnesses
J. Frank Culverwell.
Chas. S. Hoyer.
Fred Clark, Inventor.
By C. A. Snow & Co.
Attorneys

UNITED STATES PATENT OFFICE.

FRED CLARK, OF CLEARLAKE, MINNESOTA, ASSIGNOR OF ONE-HALF TO CARL D. SCHWAB, OF SAME PLACE.

FISH-HOOK.

SPECIFICATION forming part of Letters Patent No. 679,296, dated July 30, 1901.

Application filed October 12, 1900. Serial No. 32,853. (No model.)

*To all whom it may concern:*

Be it known that I, FRED CLARK, a citizen of the United States, residing at Clearlake, in the county of Sherburne and State of Minnesota, have invented a new and useful Fish-Hook, of which the following is a specification.

This invention relates to an improvement in fish-hooks; and the primary object of the same is to provide a simple and effective trolling-hook of a form of construction whereby the points will be fully protected without interference in any manner with their function while trolling or fishing among weeds or grass and capable of withstanding a greater pressure laterally before projecting the points or barbs thereof than similar devices as heretofore constructed, and also to have the hooks so unretardingly movable in lateral directions that their spring tension may be varied to render them more sensitive in the quick projection of their points or increase their inward normal location to such an extent as to require a very strong pressure to project the said points, and, furthermore, by such characteristic to permit ready access to auxiliary hooks above the lower main hooks for truing or otherwise manipulating said auxiliary hooks.

To this end the invention contemplates as the essential feature a cluster or group of two lower hooks and an upper cluster or group of two smaller hooks at a right angle to the former, both clusters having the points inturned toward each other and arranged vertically and the points of the lower hooks below the plane of the bends or elbows of the upper hooks for permitting unretarded lateral opening and closing movement of said lower hooks, the shanks of the two hooks of both clusters being secured to spring-loops having legs diverging from their upper ends and one shorter than the other, so that the longer one can be projected above the shorter one to form an attaching-eye.

The invention further consists in the construction and arrangement of the several parts in detail, as will be more fully hereinafter described and claimed.

In the drawings, Figure 1 is a perspective view of a trolling hook or device embodying the features of the invention. Fig. 2 is a similar view showing the position of the hooks after a strike has been made. Fig. 3 is an elevation of a portion of the device, showing the manner of laterally adjusting the hooks of the lower cluster. Fig. 4 is a view similar to Fig. 3, showing the manner of adjusting the hooks of the upper cluster. Fig. 5 is a detail elevation of the larger loop and lower cluster of hooks. Fig. 6 is a view similar to that shown by Fig. 5, showing the smaller loop and upper cluster of hooks.

Similar numerals of reference are employed to indicate corresponding parts in the several views.

The numeral 1 designates a spring-wire loop having divergent legs integral with the shanks 2 of a lower cluster or group of two hooks 3, having their barbed or pointed ends 4 inturned toward each and vertically arranged in close relation, so that they will pass each other when the cluster or group is operated, either when a strike is made or during trolling-pressure to a degree that is readily adjustable in the present instance. A second spring-wire loop 5 is provided and of less extent or smaller than the loop 1, the said loop 5 also having divergent legs 6 integral with the shanks 7 of an upper cluster or group of two hooks 8, which are of less dimension than the hooks 3. The loop 5 is arranged in a plane at right angles to the loop 1 and secured to the latter by winding wire or other suitable material around the closely-arranged reduced extremities of both loops and the fastening completed by the application of suitable solder or other adhesive substance. In securing the reduced loop extremities as set forth the upper end of the loop 1 is permitted to project above the upper end of the loop 5 to form an attaching-eye 9, and by constructing the resilient supporting means for the groups of hooks in the form of spring-wire loops a material advantage is gained in the cost of production and the time required to fasten the parts with reliable firmness, because the said loops can be more readily assembled in the angular relation desired than if the legs were made of separate wires and bunched and afterward adjusted. It is obvious that an accurate disposition of the legs can be acquired by the use of the loops, and therefore the securement of the same will be more expeditious as well as stronger, as one leg cannot become loose and break off from the fastening, and before dismemberment can ensue either one of the loops will have to be completely detached. Moreover, by projecting the reduced end of one loop above the other loop to form an eye the usual extra work required to apply an eye made separately is avoided and a much stronger resultant construction ensues by reason of causing the lines of strain to be directly applied to the legs of the larger loop and decrease the possibility of pulling the eye off under heavy weight, as in landing large fish.

The lower cluster or group of hooks 3 have their pointed ends or barbs in a plane below that of the bends or elbows of the cluster or group of hooks 8, so that said lower hooks may have unretarded inward and outward lateral movement without contacting with any portion of the said upper hooks. This arrangement was devised to carry out very important functions not attainable in hooks as heretofore constructed and embodying a similar principle of operation, and in the said old form of hooks the cluster of lower hooks was limited in its adjustment and no provision made for increasing or decreasing the extent of the same laterally to accommodate various conditions found in different waters, or to make the same hook structure equally effective for use with large fish or those having peculiarities in their methods of striking, or to compensate for variations in the thickness of the weeds or grass through which it is desired to troll, and also reducible to compensate for the contracted area of the mouths of certain other fish, both large and small. The improved construction is capable of adjustment to meet all the said contingencies and adapt one hook arrangement, as set forth, for various uses by a simple method of adjustment. As shown by Fig. 3, the legs of the loop 1 can be spread apart laterally any distance and the degree of divergence increased, so that it will require a greater pressure on the shanks of the hooks carried by said loop-legs to force the points of the hooks outward beyond the plane of the said shanks, and by this means the improved hook can be arranged at will for use in trolling in grass or weeds having a variation in thickness of growth or for use in catching those fish which are slow to fully take in the hooks and fully apply the mouth force to the legs and shanks, and in the latter instance a too sensitive projection or quick outward movement of the hook-points would result in the failure to obtain a firm hold or positive strike, and the fish would be lost. The divergence of the legs of the loop 1 and also of the loop of the upper cluster can be made to retain the angle desired by moving the fingers of the hand longitudinally over the legs of the loops and at the same time apply a slight pressure, and the maximum outward extent of the hooks of the lower cluster can be obtained independent of the adjustment of the upper cluster in a similar manner, or both sets of legs can be proportionately adjusted for the same purpose. The hooks of both clusters may also be rendered extremely sensitive for trolling in open waters or those devoid of growths and to have the points of the hooks work very quickly to catch fish striking very suddenly and forcefully, and in all the manifold adjustments that can be obtained and pursued there is no liability of breaking the legs, owing to their continuous formation with each other through the provision of the loops. The unretarded opening movement of the hooks of the lower cluster also permits sighting the cluster above from the bottom of the device in truing the said upper cluster and ascertain if it be centrally positioned with relation to the upper cluster. This central position of the upper cluster of hooks is essential, because if projected to one side they might be operated before the hooks of the lower cluster, which would be objectionable for many reasons.

To the eye 9 the lower end of a connecter 10 is movably attached and comprises an intermediate body-wire 11, with an upper attaching-hook 12 for the application of a swivel 13, which can be readily separated from the said hook and forms the means of attaching the line. On the said body-wire 11 a U-shaped clip 14 is slidingly mounted by having eyes 15, formed in the ends thereof, of greater dimensions than the wire and through which the latter is passed. To prevent the ends of the clip from being forced toward each other to such an extent as to bind on the wire body 11, a space-sleeve 16 is mounted on the wire in a loose manner between the clip ends. A spoon 17 is loosely attached to the clip by having an eye 18 formed in the upper end of the spoon of greater diametrical extent than the width of the clip-bow and to receive the latter, as clearly shown, and by this means the spoon is permitted to have a free rotary or whirling movement and to slip longitudinally on the body-wire 11, a loose washer 19 being interposed between the lower fastening end of the connector and the lower end of the clip.

By forming the loops and shanks of the hooks integral or continuous another valuable improvement results, by reason of the time and labor saved over the ordinary method of attaching the hook-shanks to the legs. Furthermore, by this construction a more durable device results, and the assemblage of the two loops completes the main structure of the improved hook. The size of the stock employed in the make-up of the combined loops and shanks, including the hooks, will depend on the dimensions of the latter, and in preparing these combined devices the hooks are first shaped as desired and the points or barbs carefully formed, and then each loop with its hooks is highly tempered, the temper being afterward sufficiently drawn to produce the upper reduced portions of the loops without in the least interfering with the resiliency of the legs. After the upper bends have been properly acquired they can be retempered.

Many other advantages aside from those set forth will become apparent by the use of the improved hook and the adjustment specified will be found to be of material importance in adapting the device to different conditions.

Having thus described the invention, what is claimed as new is—

1. A trolling-hook comprising an upper and a lower group of two hooks arranged in planes at right angles to each other, both groups having the pointed ends of the hooks inturned toward each other and continuous with bendable resilient shanks, the pointed ends of the hooks of the lower group being below the plane of the lowermost portions of the bends or elbows of the upper hooks to permit the said lower hooks to have free and unretarded outward lateral movement beyond the vertical plane of said upper hooks and also free inward movement to increase or decrease the lateral extent of the lower hooks.

2. A trolling device comprising an upper and a lower group of two hooks arranged in planes at right angles to each other, both groups having the pointed ends of the hooks inturned toward each other and continuous with depending shanks integrally continuing from the lower portions of spring-loops of different lengths and having the upper reduced looped or bent portions thereof contiguously arranged at right angles and the bend of the shorter loop fitted within that of the longer one, the bend of the longer loop being projected above that of the shorter loop to form an eye for attaching purposes, the pointed ends of the lower group of hooks being below the plane of the lowermost portions of the elbows or bends of the hooks of the upper group to permit the said lower group of hooks to have unretarded inward and outward lateral movement beyond the vertical plane of the said upper group of hooks.

In testimony that I claim the foregoing as my own I have hereto affixed my signature in the presence of two witnesses.

FRED CLARK.

Witnesses:
E. E. DOYLE,
FRANK S. APPLEMAN.